(12) United States Patent
Dajek

(10) Patent No.: US 8,617,442 B2
(45) Date of Patent: Dec. 31, 2013

(54) CONNECTING FIBER-REINFORCED MATERIAL TO AN INJECTION-MOULDED MATERIAL

(75) Inventor: Ulrich Dajek, Leverkusen (DE)

(73) Assignee: Lanxess Deutschland GmbH, Leverkusen (DE)

( * ) Notice: Subject to any disclaimer, the term of this patent is extended or adjusted under 35 U.S.C. 154(b) by 124 days.

(21) Appl. No.: 12/814,599

(22) Filed: Jun. 14, 2010

(65) Prior Publication Data

US 2010/0244316 A1 Sep. 30, 2010

Related U.S. Application Data

(62) Division of application No. 12/095,333, filed as application No. PCT/EP2006/011091 on Nov. 20, 2006, now Pat. No. 7,820,280.

(30) Foreign Application Priority Data

Nov. 29, 2005 (DE) .................... 10 2005 057 181

(51) Int. Cl.
*B29C 45/14* (2006.01)
(52) U.S. Cl.
USPC ........... 264/266; 264/257; 264/258; 264/259; 264/271.1; 264/273; 264/279; 264/279.1
(58) Field of Classification Search
USPC .............. 264/257–258, 259, 266, 271.1, 273, 264/279, 279.1
See application file for complete search history.

(56) References Cited

U.S. PATENT DOCUMENTS

| 4,670,331 A | | 6/1987 | Radvan et al. |
| 5,439,627 A | * | 8/1995 | De Jager ........................ 264/129 |
| 5,514,322 A | * | 5/1996 | Noritake ........................ 264/240 |
| 5,639,536 A | * | 6/1997 | Yamazaki et al. ............ 428/141 |
| 6,331,263 B1 | * | 12/2001 | Abe et al. ...................... 264/40.5 |
| 6,503,585 B1 | | 1/2003 | Wagenblast et al. |
| 6,713,008 B1 | * | 3/2004 | Teeter ............................ 264/258 |
| 7,445,836 B2 | | 11/2008 | Yamane et al. |
| 2002/0022422 A1 | * | 2/2002 | Waldrop et al. ............... 442/179 |
| 2002/0148553 A1 | * | 10/2002 | Campbell, Jr. ................. 156/211 |
| 2004/0067705 A1 | * | 4/2004 | Ton-That et al. ................ 442/65 |
| 2005/0257887 A1 | * | 11/2005 | Tsotsis ........................ 156/308.2 |
| 2008/0292858 A1 | | 11/2008 | Dajek |
| 2010/0092770 A1 | | 4/2010 | Wadahara et al. |

FOREIGN PATENT DOCUMENTS

DE 41 15 832 A1 11/1992

* cited by examiner

*Primary Examiner* — Amjad Abraham
(74) *Attorney, Agent, or Firm* — Norris McLaughlin & Marcus, P.A.

(57) ABSTRACT

A process for the bonding of a fiber-reinforced material to an injection-molding material and an article produced by the process. The process improves the bond between a fiber-reinforced starting material and a material applied by injection. A further plastics material is inserted under pressure into a fiber-reinforced plastics material. This results in interlock bonding between the further plastics material and the fibers of the fiber-reinforced plastics material. This type of bonding is substantially more stable than known bonding.

8 Claims, 2 Drawing Sheets

CONNECTING FIBER-REINFORCED MATERIAL TO AN INJECTION-MOULDED MATERIAL

This application is division of U.S. Ser. No. 12/095,333, now pending, which is a 371 of PCT/EP2006/011091, filed Nov. 20, 2006, which claims foreign priority benefit under 35 U.S.C. §119 of the German Patent Application No. 10 2005 057 181.6 filed Nov. 29, 2005.

The invention relates to a process for the bonding of a fiber-reinforced plastics material to a further plastics material. The invention further relates to a molding produced by the process.

A process known from the prior art begins, if necessary, by subjecting a fiber-reinforced starting material in the form of a sheet to a forming process. Plastics material is injected, as can be found by way of example in the publication by Sonja Pongratz and Hans Laich "Es muss nicht immer Stahl sein" [It doesn't always have to be steel], in Kunststoffe July 2004, in an injection mold onto the starting material after it had been subjected to the forming process. Fiber-reinforced starting material in the form of a sheet for the purposes of the present invention is commercially available, for example from the company Bond-Laminates GmbH in Brilon, Germany. The fibers are composed by way of example of glass, carbon, or aramid. The material also encompasses thermoplastics or thermosets. Thermoplastics used comprise PA (=polyamide), PBT (=polybutylene terephthalate), TPU (=thermoplastic polyurethane), PC (=polycarbonate), or PPS (=polyphenylene sulfide), as published in November 2005 by way of the Internet on the www.bond-laminates.com page. This Internet page also reveals that the starting material can be used for production of moldings via a forming process and/or attachments of bonding elements and of reinforcing elements via welding or injection molding.

A disadvantage is that the material applied by injection molding merely has adhesive bonding to the starting material that was subjected to the forming process. This type of bonding is relatively unstable.

It is an object of the invention to improve the bonding between a fiber-reinforced starting material and a material attached thereto.

The object is achieved via a process with the features of the first claim, but also via a molding with the features of the ancillary claims. The invention provides a process for the bonding of a fiber-reinforced plastics material (2) to a further plastics material, by to some extent inserting the further plastics material (5) under pressure into the fiber-reinforced plastics material.

The invention therefore also provides a molding composed of a fiber-reinforced plastics material (2) bonded to a further plastics material (5) with bonding sites of this type in which fibers (7) of the fiber-reinforced plastics material have been displaced toward the outside.

Advantageous embodiments are revealed in the subclaims.

To achieve the object, therefore, a further plastics material is to some extent inserted under pressure into a fiber-reinforced plastics material. The result of this is interlock bonding between the further plastics material and the fibers of the fiber-reinforced plastics material. This type of bonding is substantially more stable than the bonding known from the prior art. That proportion of the further plastics material which has not been subject to insertion under pressure forms by way of example a functional element or a reinforcing element which has thus been attached in an improved manner to the fiber-reinforced plastics material.

The plastic of the fiber-reinforced plastics material is preferably softened or plasticized. Further plastics material is applied by injection to the fiber-reinforced plastics material on one side in such a way that a portion of the further plastics material is pressed outward at the opposite side. The plastics material applied by injection thus moves between the fibers of the fiber-reinforced plastics material. The result is therefore not only adhesive bonding or weld bonding but also interlock bonding between the further plastics material applied by injection and the fiber-reinforced plastics material.

In one embodiment of the invention, the interlocking bond achieved between the further plastics material applied by injection and the fiber-reinforced plastics material merely takes the form of points. Bonding in the form of points can be achieved in a simple technical manner, specifically by conventional injection molding.

Figure 1:
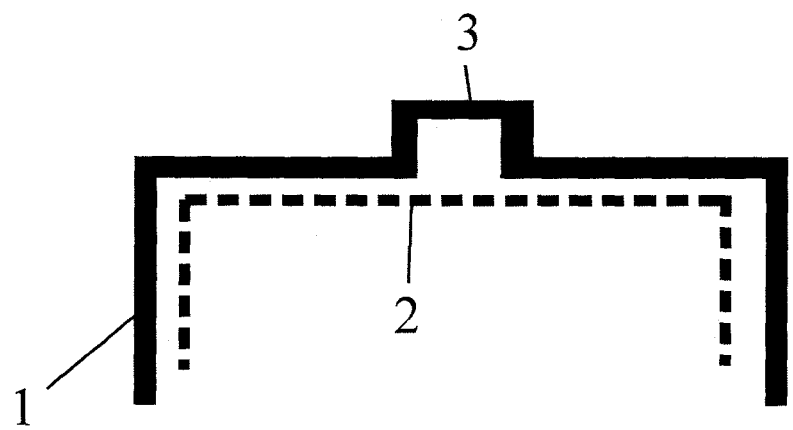
FIG. 1 shows an injection mold with fiber-reinforced plastics material introduced.

In order to achieve bonding in the form of points by injection molding, a fiber-reinforced Plastics material (2) which if necessary has been previously subjected to a suitable forming process is placed in an injection mold (1). The injection mold (2) has depressions (3). The location of the depressions (3) is behind the fiber-reinforced plastics material (2) introduced, as is visible in FIG. 1, which shows a section through the injection mold (1) and the fiber-reinforced plastics material introduced.

Figure 2:
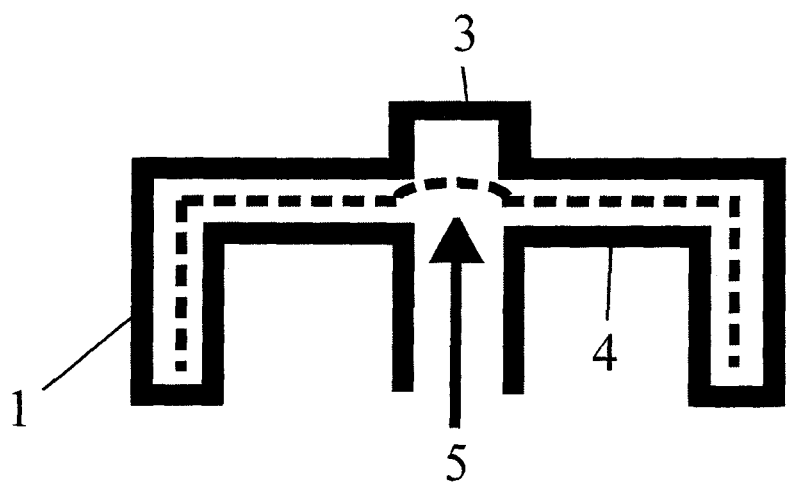
FIG. 2 shows a closed injection mold.

The injection mold (1) is then sealed by a countermold (4). In the case of thermoplastic, the plastic of the fiber-reinforced plastics material is softened via a temperature increase. Further plastics material is then inserted under pressure into the countermold as can be seen in FIG. 2, for example using a pressure of from 600 to 1000 bar. Injected plastics material (5) then penetrates into the fibers of the fiber-reinforced starting material (2) at the sites whose reverse side has a depression (3). The result goes beyond the prior art in providing interlock bonding between the fiber-reinforced plastics material and the injected plastic.

The fibers of the fiber-reinforced plastics material (2) are regularly displaced here in the direction of depression (3), as shown diagrammatically in FIG. 2.

Figure 3:
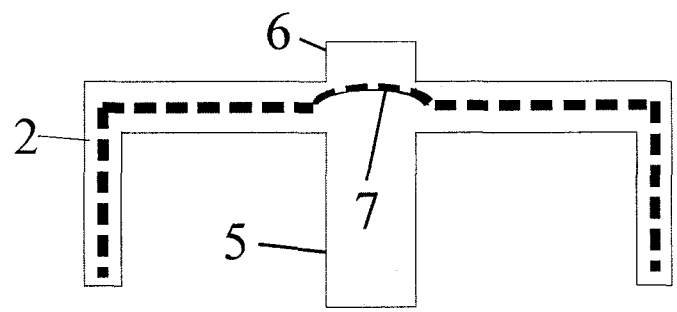
FIG. 3 shows a molding produced.

FIG. 3 illustrates some typical features of the resultant molding. The fiber-reinforced plastics material (2) has a fillet (5) applied by injection on one of its sides and, on the opposite side, a nub-shaped protrusion (6), which has been produced by virtue of the depression (3). In this region, the fibers of the fiber-reinforced material (2) have been displaced in the direction of the projection (6).

By way of example, this method can be used to apply, by injection, a reinforcing rib structure which, at points of inflection or points of intersection, also has bonding in the form of points via interlock bonding to the fiber-reinforced plastics material.

An injection mold (1) can have depressions (3) in the form of grooves instead of depressions (3) distributed in the form of points. Interlock bonding is then produced along a groove (3). This method can be used by way of example to achieve complete interlock bonding of ribs to a fiber-reinforced plastics material. Projections (6) running in the form of lines are then produced on the opposite side.

If a projection (6) is undesired, it can finally be removed by milling or grinding. The displacement of fibers (7) of the fibrous material in a manner visible in FIG. 3 remains as characteristic feature.

It is preferable to use thermoplastic materials, since these can be softened by temperature increase. Conventional injection molding techniques and injection molding equipment can be adopted for carrying out the process, as long as these can typically withstand pressures of 1000 bar.

Thermoplastic materials with particularly good suitability for the conduct of the invention are PA 6,6, PA 6, PBT, PP (=polypropylene), PET (=polyethylene terephthalate), PA 12, PPS, TPU or PA 4,6. Preference is therefore given to semicrystalline plastics with low viscosity which are not susceptible to internal stresses. However, some amorphous materials are also suitable, and specifically and especially PS (=polystyrene), ABS (=acrylonitrile-butadiene-styrene), and/or PC. The plastics mentioned can also be mixed with one another.

A desired forming process for fiber-reinforced plastics material preferably takes place in an injection mold (1) via sealing with a counter-mold (4), giving a particularly low-cost production process. It is preferable that the fiber-reinforced plastics material is preheated, prior to its insertion, to a temperature which exceeds the melting point of the plastic by from 20 to 40° C. Melting point here means at least the temperature required to permit injection of the plastic in the injection molding process. The result is firstly that the fiber-reinforced plastics material can readily undergo a forming process. Secondly, the plastic is not liquefied to the extent that handling becomes difficult. Lower temperatures during the forming process are possible, but this makes the forming step more difficult.

In order to achieve particularly stable interlock bonding, the fiber-reinforced material has continuous-filament fibers which have preferably been braided with one another. The fiber-reinforced plastics material then has, for example, fibers in the form of a textile.

Fiber-reinforced plastics materials with particularly good suitability take the form of sheet-like starting material whose wall thickness is from 0.5 to 6 mm. If the starting material is too thick, it is then difficult to impress the plastics material into the fibers. Excessively thin starting material does not have sufficient stability.

The inventive process permits the production of components from a single material. An article produced according to the invention is then therefore composed of only one plastic. This simplifies recycling.

One embodiment of the process uses application by injection in order to bond two fiber-reinforced plastics materials in the form of sheets to one another. This gives two partially superposed sheets. Plastic is applied by injection from one side in such a way that plastic from one of the sheets penetrates into the fibers of the other sheet. This gives particularly stable bonding.

In order to make a further improvement in the total stability of articles produced in one embodiment of the invention, plastics material mixed with fibers is bonded to the fiber-reinforced plastics material. The further plastics material then uses chopped fibers whose average initial fiber length is preferably from 2 to 15 mm. The average initial fiber length is particularly preferably from 2 to 3 mm, in order to obtain particularly good results. The lengths of the fibers used become shorter by virtue of the further processing, and specifically and regularly by a factor of 10. The average fiber length in the product produced is therefore regularly from a few tens of µm to 2 mm. It is preferably not only the average length that is within the stated range but also all or most of the individual fibers.

The invention is preferably used to produce oil pans, for example for motor vehicles, with external rib structure. The ribs have inter alia interlock bonding to the container. The ribs serve for absorption of energy in the event of stone impact, and also in the event of an accident, in order to prevent damage to the container. They therefore provide particularly dependable protection of the container and are not merely broken away when the oil pan is subject to stone impact during travel. According to the invention, it is then equally possible to attach a fastening collar for the oil pan.

There are no corrosion problems, and this is another factor favoring production of an oil pan from plastic.

The bonds produced according to the invention are, and remain, dependably impermeable to liquid and gas. Another preferred application sector is provided by articles in which importance is placed on bonds which are dependably impermeable to liquid and/or gas. An example of one preferred application sector is therefore bulkheads which protect the interior of a car from water penetration.

The mold costs for carrying out the process are relatively low. However, production is relatively slow. According to the invention it is therefore preferable to produce articles which are produced with relatively small numbers of units. The overall production of these can be achieved at lower cost when comparison is made with alternative production processes. One preferred application sector is therefore components of trucks and niche-market cars such as cabriolets, in order to replace components hitherto entirely or to some extent produced from metal. For the purposes of the invention, the numbers of units produced of these vehicles are small.

The bond is not damaged by temperature variations. Another preferred application sector is therefore moldings or articles which have exposure to temperature variations, which the bonds have to resist. The invention can therefore by way of example also be used in moldings for aircraft.

Another typical field of application for the invention is protective helmets with fastening elements or rib structures. Fastening elements are attached according to the invention. By way of example, the fastening elements serve to fasten a visor on the helmet or Styropor® within the helmet.

Inventive examples started from commercially available, fiber-reinforced thermoplastic materials in the form of sheet from Bond-Laminate GmbH. The thickness of the sheets was 2 mm. The sheets were rectangular, with length 380 mm and width 128 mm. They had three holes which served for positioning in the injection mold. The plastics material used comprised inter alia PA6. The fibers were composed of glass, carbon, or aramid.

Figure 4:
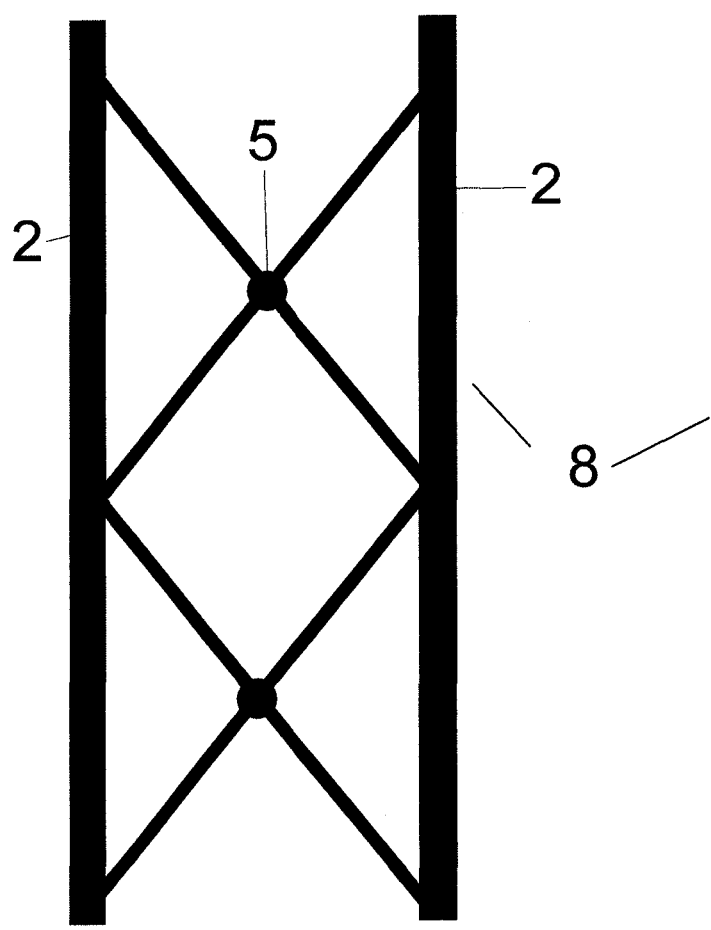
FIG. 4 shows a section of a substrate produced, seen from the lower side.

The sheets were preheated for 3 minutes at 300° C. in an oven and inserted into an injection mold. The mold temperature set was 95° Celsius. The shape of the injection mold was such as to permit production of the substrate reinforced with ribs 8. Behind the inserted fiber-reinforced starting material there were, in the injection mold—as can be seen from FIGS. 1 and 2—circular recesses 3 at a distance of 5.5 cm with diameter 9 mm and depth 1 mm. Closure of the injection mold first brought about a forming process on the fiber-reinforced starting material and this was followed by injection of further glass-fiber-reinforced PA 6 plastics material using an injection rate of 120 mm/s. The injection pressure was initially 900 bar for one second. The post-injection pressure was 600 bar for a further 8 seconds. After a cooling time of 30 seconds, the injection mold was opened and the substrate produced, reinforced with ribs, was ejected. The ribs 8 had also been bonded in the form of points to the fiber-reinforced material via interlock bonding in the manner visible in FIG. 3. FIG. 3 shows a section of a substrate thus produced. The fillet 5 represents a point of intersection of two intersecting ribs 8. FIG. 4 shows a section of a substrate produced, seen from the lower side. Ribs 8 also have interlock bonding in the form of points by way of the fillets 5 to the fiber-reinforced starting material 2. The result was therefore a substantially stronger bond between the fiber-reinforced starting material 2 and the other plastics material, when comparison is made with the prior art mentioned in the introduction.

What is claimed is:

1. A process for bonding a fiber-reinforced plastics material to a further plastics material, said process comprising:
   (a) introducing the fiber-reinforced plastics material into an injection mold, wherein the injection mold has, behind the fiber-reinforced plastics material introduced, at least one depression, wherein the fiber-reinforced plastics material has first and second opposing sides differing in distance from the at least one depression, and wherein the first of said opposing sides is a farther distance from said at least one depression than said second of said opposing sides, and
   (b) bonding the fiber-reinforced plastics material to the further plastics material by inserting the further plastics material under pressure into the fiber-reinforced plastics material from said first side, and continuing between fibers of said fiber-reinforced plastics material so that the fiber-reinforced plastics material is thereby displaced into the at least one depression, and the further plastics material is eventually pressed outward of the fiber-reinforced plastics material at said second side.

2. The process according to claim 1, which comprises inserting the further plastics material under a pressure of from 600 to 1000 bar into the fiber-reinforced plastics material from said first side.

3. The process as claimed in claim 1, in which the further plastic is inserted under pressure in the form of points or lines into the fiber-reinforced plastics material.

4. The process as claimed in claim 1, in which the fiber-reinforced plastics material is softened or plasticized prior to the inserting.

5. The process as claimed in claim 1, in which the fiber-reinforced plastics material is thermoplastic, and the fiber-reinforced plastics material is heated, prior to the inserting, to a temperature which is at most 20° C. above the melting point of the thermoplastic.

6. The process as claimed in claim 1, which further comprises preheating fiber-reinforced, thermoplastic material to a temperature which is from 20 to 40° C. above the melting point of the thermoplastic material.

7. The process as claimed in claim 1, in which the fiber-reinforced plastics material, the further plastics material or both the fiber-reinforced plastics material and the further plastics material comprises polyamide 6,6, polyamide 6, polybutylene terephthalate, polypropylene, polyethylene terephthalate, polyamide 12, polyphenylene sulfide, thermoplastic polyurethane and/or polyamide 4,6, or a mixture thereof.

8. The process as claimed in claim 1, in which the fiber-reinforced plastics material, the further plastics material or both the fiber-reinforced plastics material and the further plastics material comprises polystyrene, acrylonitrile-butadiene-styrene, and/or polycarbonate, or a mixture thereof.

* * * * *